US012699876B2

(12) United States Patent
Keshva Srinivas et al.

(10) Patent No.: US 12,699,876 B2
(45) Date of Patent: Aug. 4, 2026

(54) SYSTEMS AND METHODS OF ANOMALY DETECTION IN LARGE SCALE PRODUCTION ENVIRONMENTS USING TIME-SERIES MODELING

(71) Applicant: Walmart Apollo, LLC, Bentonville, AR (US)

(72) Inventors: Krishna Koti Keshva Srinivas, Bengaluru (IN); Ekta Gujral, Union City, CA (US); Sanjay Valappile Kandy, Bangalore (IN); Jonathan Michael Sidhu, Mountainside, NJ (US); Ravishankar Balasubramanian, Bengaluru (IN); Abin Abraham, Bangalore (IN); Dilip Jana, Allen, TX (US); Poonam Chandramohan Dhanwani, Dublin, CA (US); Bijayani Sanghamitra Mishra, San Jose, CA (US); Himani Agrawal, Frisco, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 638 days.

(21) Appl. No.: 18/301,471

(22) Filed: Apr. 17, 2023

(65) Prior Publication Data
US 2024/0346287 A1 Oct. 17, 2024

(51) Int. Cl.
*G06N 3/0442* (2023.01)

(52) U.S. Cl.
CPC .................................. *G06N 3/0442* (2023.01)

(58) Field of Classification Search
CPC .................................................... G06N 3/0442
See application file for complete search history.

(56) References Cited

U.S. PATENT DOCUMENTS

| | | | |
|---|---|---|---|
| 11,200,607 B2 * | 12/2021 | Liu | G06Q 30/0605 |
| 11,494,661 B2 | 11/2022 | Wu et al. | |
| 11,575,697 B2 | 2/2023 | Palani et al. | |
| 11,580,842 B1 * | 2/2023 | Hauser | G08B 21/182 |
| 2020/0034733 A1 * | 1/2020 | Pang | G06T 11/001 |
| 2020/0097810 A1 | 3/2020 | Hetherington et al. | |

(Continued)

OTHER PUBLICATIONS

Modeltime Business Science, "Forecasting with Global Models," https://business-science.github.io/modeltime/articles/modeling-panel-data.html, Retrieved from Internet Mar. 1, 2023, 22 pages.

(Continued)

*Primary Examiner* — Christopher E Dunay
(74) *Attorney, Agent, or Firm* — Fitch, Even, Tabin & Flannery LLP

(57) ABSTRACT

Systems and methods of anomaly detection using a generalized time-series forecasting model are disclosed. A time-series dataset is received and a forecast is generated for the time-series dataset utilizing a trained generalized time-series forecasting model configured to utilize a fixed set of characteristic features. A first anomaly determination for the time-series dataset is generated based on a comparison of the forecast for the time-series dataset to the time-series dataset. In response to the first anomaly determination identifying an anomaly, an anomaly identification notification is transmitted to an additional system associated with the anomaly identification.

19 Claims, 9 Drawing Sheets

200

Receive Real-Time Signal Data — 202

Pre-Process Signal Data — 204

Identify Anomalies using Trained Anomaly Detection Models including Generalized Time Series Model — 206

Bucket Anomalies and Provide to Assigned Systems — 208

Receive Anomaly Identification Feedback — 210

Update Individual Models including Generalized Time Series Model — 212

(56) References Cited

U.S. PATENT DOCUMENTS

| 2022/0198263 A1 | 6/2022 | Guo et al. |
| 2023/0029794 A1* | 2/2023 | Huang ................ H04L 63/1425 |
| 2023/0056595 A1* | 2/2023 | Park ..................... G06N 3/0442 |
| 2023/0118240 A1* | 4/2023 | Wong ................. G06Q 20/4015 |
| | | 705/44 |

OTHER PUBLICATIONS

Salinas et al., "DeepAR: Probabilistic forecasting with autoregressive recurrent networks," International Journal of Forecasting, (2020), p. 1181-1191.
Bandara et al., "Sales Demand Forecast in E-commerce using a Long Short-Term Memory Neural Network Methodology," Arxiv, Aug. 11, 2019, p. 1-16.

* cited by examiner

200

Receive Real-Time Signal Data ⌇202

Pre-Process Signal Data ⌇204

Identify Anomalies using Trained Anomaly Detection Models including Generalized Time Series Model ⌇206

Bucket Anomalies and Provide to Assigned Systems ⌇208

Receive Anomaly Identification Feedback ⌇210

Update Individual Models including Generalized Time Series Model ⌇212

300

Receive Time-Series Training Data    302

Generate Characteristic Features and Label Time Series    304

Apply Iterative Training Process    306

Training Complete?    308

No

Yes

Output Trained Anomaly Detection Model    310

SYSTEMS AND METHODS OF ANOMALY DETECTION IN LARGE SCALE PRODUCTION ENVIRONMENTS USING TIME-SERIES MODELING

TECHNICAL FIELD

This application relates generally to training of machine learning models, and more particularly, to time-series machine learning forecasting.

BACKGROUND

Time-series forecasting models can be used to predict future values of one or more variables over a period of time. Time-series forecasting models can be developed based on previous time-series data. In the context of catalogs of items, such as those associated with websites, time-series forecasting can be generated for individual items within the catalog. Some traditional approaches build models at a time-series level. Such approaches cannot be used to generalize new products which are not in a training dataset even if similar products are included in a training dataset'.

Although current approaches provide some expanded model applicability, the use of unique representations assumes that the time-series are entirely unrelated (as the identifiers are orthogonal), preventing application of existing models to new but similar datasets. Training item-specific models is highly resource-intensive for large catalogs of items, creating bottlenecks during training or retraining of models. In addition, maintenance of the large number of item-specific models that would be required for a catalog is prohibitively time and resource dependent.

SUMMARY

In various embodiments, a system including a non-transitory memory and a processor communicatively coupled to the non-transitory memory is disclosed. The processor is configured to read a set of instructions to receive a time-series dataset, generate a forecast for the time-series dataset utilizing a trained generalized time-series forecasting model configured to utilize a fixed set of characteristic features, and generate a first anomaly determination for the time-series dataset based on a comparison of the forecast for the time-series dataset to the time-series dataset. In response to the first anomaly determination identifying an anomaly, the processor is further configured to transmit an anomaly identification notification to an additional system associated with the anomaly identification.

In various embodiments, a computer-implemented method is disclosed. The method includes steps of receiving a time-series dataset and generating, by a trained generalized time-series forecasting model, a forecast for the time-series dataset using a fixed set of characteristic features. The method further includes steps of generating a first anomaly determination for the time-series dataset based on a comparison of the forecast for the time-series dataset to the time-series dataset. In response to the first anomaly determination identifying an anomaly, the method includes a step of transmitting an anomaly identification notification to a system associated with the anomaly identification.

In various embodiments, a computer-implemented method is disclosed. The method includes steps of receiving a plurality of historic time-series datasets, generating a fixed set of characteristic features for each of the time-series datasets, generating at least one time-based feature for each of the time-series datasets, iteratively training a generalized time-series forecasting model to generate a time-series forecast based, at least in part, on the fixed set of characteristic features and the at least one time-based feature generated for each of the time-series datasets, and storing the generalized time-series forecasting model in a model store database.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
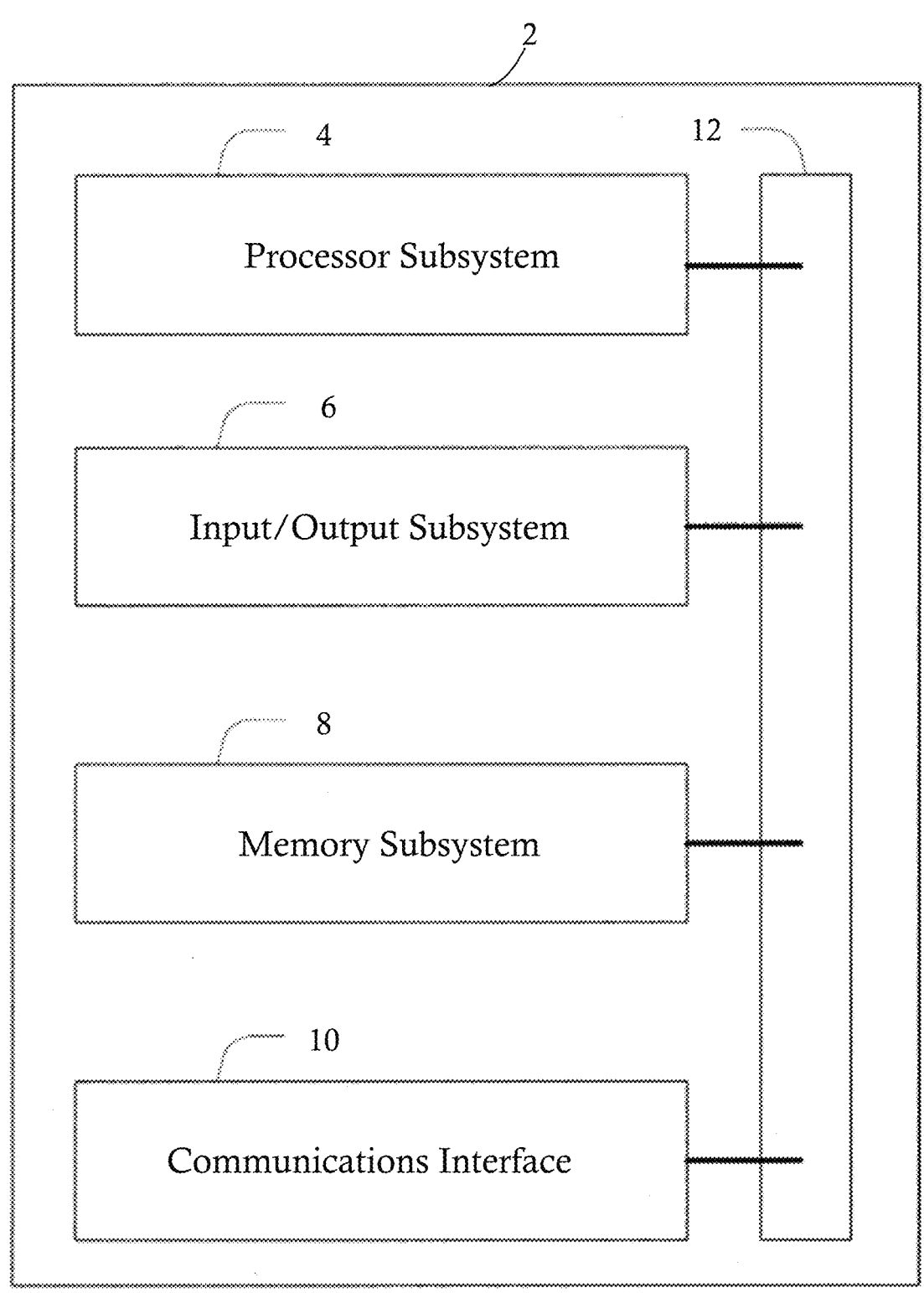
FIG. 1 illustrates a computer system configured to implement one or more processes, in accordance with some embodiments.

This description of the exemplary embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for anomaly detection utilizing an ensemble approach including at least one generalized time-series forecast model. In various embodiments, the at least one generalized time-series forecast model can be generated based on a long short-term memory (LSTM) framework configured to receive input data including one or more summarized time-series identifiers. The generalized time-series forecast model is configured to generate a time-series forecast based, in part, on the summarized time-series identifiers. In some embodiments, the generalized time-series forecast model is configured to receive one or more time-series inputs and summarized time-series identifiers for each time-series input. The summarized time-series identifiers can include overlapping (e.g., non-unique or semi-unique) labels that include shared label elements. In some embodiments, additional models, such as a k-means clustering model, an isolation forest model, and/or a statistical profiling model can be implemented as part of the ensemble approach. In some embodiments, the summarized time-series identifiers are generated during a preprocessing step prior to operation of the generalized time-series forecast model.

In some embodiments, systems, and methods for anomaly detection utilizing at least one generalized time-series forecasting model includes a trained LSTM model configured to generate a time-series forecast based, in part, on summarized time-series identifiers. The trained generalized time-series forecasting model is configured to receive and/or generate summarized characteristic labels for each time-series model in an input set (e.g., a training dataset, a production dataset, a verification dataset, etc.). The trained generalized time-series forecasting model can be applied to items or data not originally included in the training dataset that have similar summarized characteristic labels as the summarized characteristic label for time-series included in the training dataset. As used herein, time-series can be considered "similar" when having one or more overlapping summarized characteristics.

In general, a trained function mimics cognitive functions that humans associate with other human minds. In particular, by training based on training data the trained function is able to adapt to new circumstances and to detect and extrapolate patterns.

In general, parameters of a trained function can be adapted by means of training. In particular, a combination of supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In various embodiments, a neural network which is trained (e.g., configured or adapted) to generate a time-series forecast utilizing, in part, summarized time-series identifiers, is disclosed. A neural network trained to generate a generalized time-series model may be referred to as a trained forecasting model and/or a trained time-series forecasting model. The trained forecasting model can be configured to generate forecasted trends or interactions for items based on prior time-series interactions. In some embodiments, a trained forecasting model generates a time-series forecast that is compared to actual interaction data to identify anomalies within the interaction data.

FIG. 1 illustrates a computer system configured to implement one or more processes, in accordance with some embodiments. The system 2 is a representative device and can include a processor subsystem 4, an input/output subsystem 6, a memory subsystem 8, a communications interface 10, and a system bus 12. In some embodiments, one or more than one of the system 2 components can be combined or omitted such as, for example, not including an input/output subsystem 6. In some embodiments, the system 2 can include other components not combined or comprised in those shown in FIG. 1. For example, the system 2 can also include, for example, a power subsystem. In other embodiments, the system 2 can include several instances of the components shown in FIG. 1. For example, the system 2 can include multiple memory subsystems 8. For the sake of conciseness and clarity, and not limitation, one of each of the components is shown in FIG. 1.

The processor subsystem 4 can include any processing circuitry operative to control the operations and performance of the system 2. In various aspects, the processor subsystem 4 can be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also can be implemented by a controller, a microcontroller, an application specific integrated circuit (ASIC), a field programmable gate array (FPGA), a programmable logic device (PLD), and so forth.

In various aspects, the processor subsystem 4 can be arranged to run an operating system (OS) and various applications. Examples of an OS comprise, for example, operating systems generally known under the trade name of Apple OS, Microsoft Windows OS, Android OS, Linux OS, and any other proprietary or open-source OS. Examples of applications comprise, for example, network applications, local applications, data input/output applications, user interaction applications, etc.

In some embodiments, the system 2 can include a system bus 12 that couples various system components including the processor subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCM-CIA), Small Computers Interface (SCSI) or other proprietary bus, or any custom bus suitable for computing device applications.

In some embodiments, the input/output subsystem 6 can include any suitable mechanism or component to enable a user to provide input to system 2 and the system 2 to provide output to the user. For example, the input/output subsystem 6 can include any suitable input mechanism, including but not limited to, a button, keypad, keyboard, click wheel, touch screen, motion sensor, microphone, camera, etc.

In some embodiments, the input/output subsystem 6 can include a visual peripheral output device for providing a display visible to the user. For example, the visual peripheral output device can include a screen such as, for example, a Liquid Crystal Display (LCD) screen. As another example, the visual peripheral output device can include a movable display or projecting system for providing a display of content on a surface remote from the system 2. In some embodiments, the visual peripheral output device can include a coder/decoder, also known as Codecs, to convert digital media data into analog signals. For example, the visual peripheral output device can include video Codecs, audio Codecs, or any other suitable type of Codec.

The visual peripheral output device can include display drivers, circuitry for driving display drivers, or both. The visual peripheral output device can be operative to display content under the direction of the processor subsystem 4. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 can include any suitable hardware, software, or combination of hardware and software that is capable of coupling the system 2 to one or more networks and/or additional devices. The communications interface 10 can be arranged to operate with any suitable technique for controlling information signals using a desired set of communications protocols, services, or operating procedures. The communications interface 10 can include the appropriate physical connectors to connect with a corresponding communications medium, whether wired or wireless.

Vehicles of communication comprise a network. In various aspects, the network can include local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules can communicate in accordance with a number of wired protocols. Examples of wired protocols can include Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 can include one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 can include a wireless interface comprising one or more antennas, transmitters, receivers, transceivers, amplifiers, filters, control logic, and so forth.

In various aspects, the communications interface 10 can provide data communications functionality in accordance with a number of protocols. Examples of protocols can include various wireless local area network (WLAN) protocols, including the Institute of Electrical and Electronics Engineers (IEEE) 802.xx series of protocols, such as IEEE 802.11a/b/g/n/ac/ax/be, IEEE 802.16, IEEE 802.20, and so forth. Other examples of wireless protocols can include various wireless wide area network (WWAN) protocols, such as GSM cellular radiotelephone system protocols with GPRS, CDMA cellular radiotelephone communication systems with 1xRTT, EDGE systems, EV-DO systems, EV-DV systems, HSDPA systems, the Wi-Fi series of protocols including Wi-Fi Legacy, Wi-Fi 1/2/3/4/5/6/6E, and so forth. Further examples of wireless protocols can include wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols can include near-field communication techniques and protocols, such as electro-magnetic induction (EMI) techniques. An example of EMI techniques can include passive or active radio-frequency identification (RFID) protocols and devices. Other suitable protocols can include Ultra-Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 can include any machine-readable or computer-readable media capable of storing data, including both volatile/non-volatile memory and removable/non-removable memory. The memory subsystem 8 can include at least one non-volatile memory unit. The non-volatile memory unit is capable of storing one or more software programs. The software programs can contain, for example, applications, user data, device data, and/or configuration data, or combinations therefore, to name only a few. The software programs can contain instructions executable by the various components of the system 2.

In various aspects, the memory subsystem 8 can include any machine-readable or computer-readable media capable of storing data, including both volatile/non-volatile memory and removable/non-removable memory. For example, memory can include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferro-electric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 can contain an instruction set, in the form of a file for executing various methods, such as methods for anomaly detection utilizing at least one generalized time-series forecasting model, as described herein. The instruction set can be stored in any acceptable form of machine-readable instructions, including source code or various appropriate programming languages. Some examples of programming languages that can be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processor subsystem 4.

Figure 2:
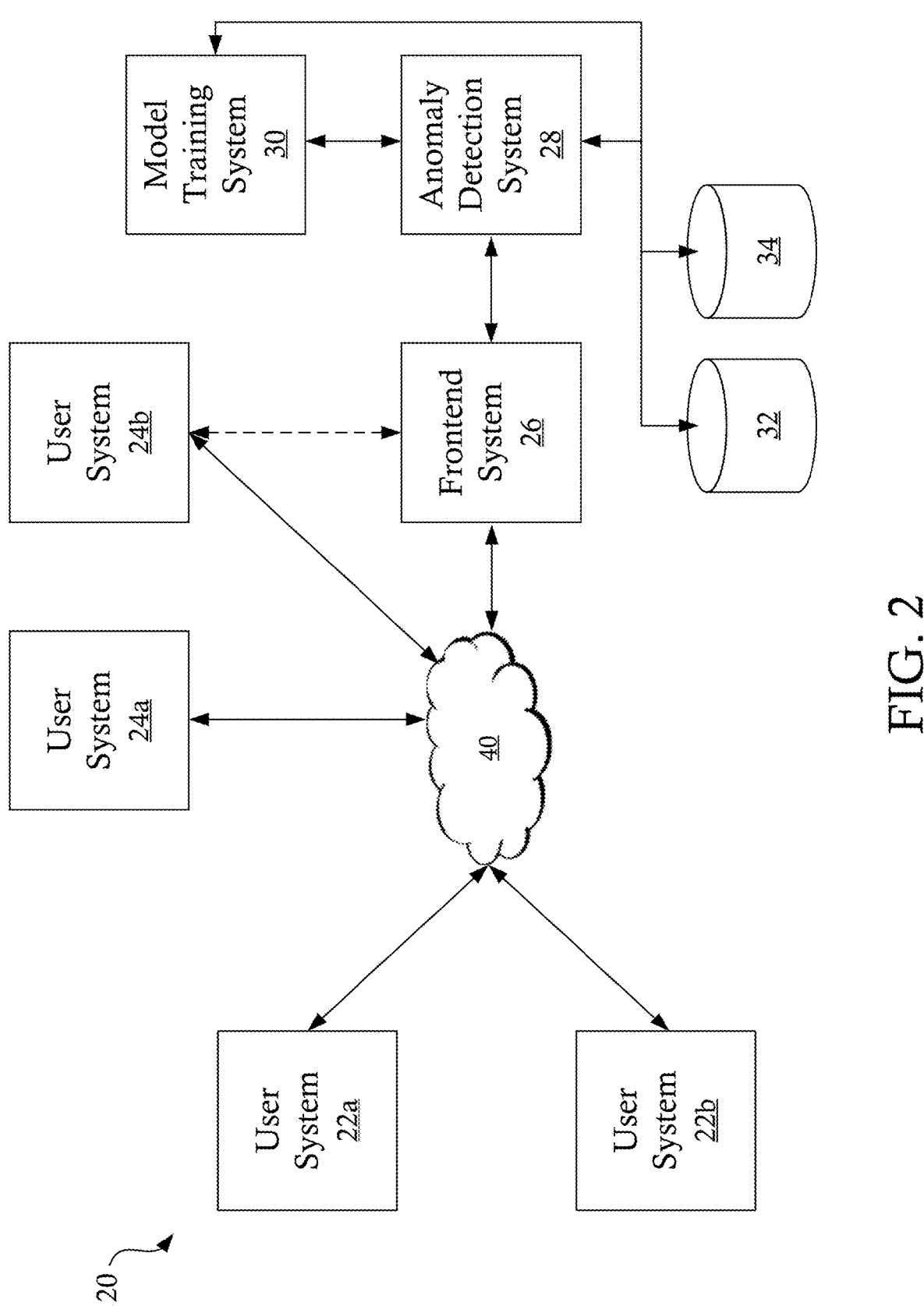
FIG. 2 illustrates a network environment configured to provide anomaly detection utilizing at least one generalized time-series model, in accordance with some embodiments.

FIG. 2 illustrates a network environment configured to provide anomaly detection utilizing at least one generalized time-series model, in accordance with some embodiments. The network environment 20 includes a plurality of systems configured to communicate over one or more network channels, illustrated as network cloud 40. For example, in various embodiments, the network environment 20 can include, but is not limited to, one or more user systems 22a, 22b, one or more reviewer systems 24a, 24b, a frontend system 26, an anomaly detection system 28, a model training system 30, a time-series database 32, and/or a model store database 34, and/or any other suitable system or component. It will be appreciated that any of the illustrated systems can include a system as described above in conjunction with FIG. 1. Although specific embodiments are discussed, herein it will be appreciated that additional systems, servers, storage mechanism, etc. can be included within the network environment 20.

Further, although embodiments are illustrated herein having individual, discrete systems, it will be appreciated that, in some embodiments, one or more systems can be combined into a single logical and/or physical system. For example, in various embodiments, the frontend system 26, the anomaly detection system 28, the model training system 30, the time-series database 32, and the model store database 34 can be combined into a single logical and/or physical system. Similarly, although embodiments are illustrated having a single instance of each system, it will be appreciated that additional instances of a system can be implemented within the network environment 20. In some embodiments, two or more systems can be operated on shared hardware in which each system operates as a separate, discrete system utilizing the shared hardware, for example, according to one or more virtualization schemes.

In some embodiments, the user systems 22a, 22b are configured to receive and/or generate a user interface to allow a user to interact with services and/or resources provided by a network system, such as frontend system 26. The user interface can include any suitable interface, such as, for example, a mobile device application interface, a network interface, and/or any other suitable interface. For example, in some embodiments, the frontend system 26 includes an interface generation engine configured to generate a customized network interface and provide the customized network interface, and/or instructions for generating the customized network interface, to a user system 22a, 22b, which displays the user interface via one or more display elements. The customized network interface can include any suitable network interface, such as, for example, an e-commerce interface, a service interface, an intranet interface, and/or any other suitable user interface. In some embodiments, the customized interface includes a webpage, web portal, intranet page, application page, and/or other interactive interface.

In some embodiments, the reviewer systems 24a, 24b are configured to receive notifications regarding anomalies or issues encountered during interactions between the user systems 22a, 22b and the frontend system 26. Anomalies can include, but are not limited to, availability anomalies (e.g., a catalog item being incorrectly indicates as in/out of availability), transaction anomalies, publishing anomalies (e.g., data mismatch between various sources), pricing anomalies, operational anomalies, return anomalies, forecasting anomalies, analytic anomalies, supply chain anomalies, fulfillment anomalies, service anomalies, safety anomalies, etc. As discussed in greater detail below, anomalies can be identified by one or more trained machine learning models, such as a generalized time-series model, and subsequently bucketed based on one or more predetermined rules. Each bucket can be routed to a selected one of the reviewer systems 24a, 24b associated correction of the specific bucket of anomalies.

In some embodiments, the frontend system 26 is configured to receive one or more signals indicative of one or more interactions between a network environment, such as a network environment provided by the frontend system 26, and one or more additional systems, such as one or more user systems 22a, 22b. The signals can be received from any suitable sources such as internal sources, external sources, and/or third party sources. In some embodiments, the frontend system 26 is in signal communication with an anomaly detection system 28. The frontend system 26 can include a data ingestion pipeline configured to receive and process the signals and provide a set of processed signals to the anomaly detection system 28.

In some embodiments, the anomaly detection system 28 is configured to ingest the received processed signals and apply one or more machine learning models to identify anomalies with the signals. The one or more machine learning models can include an ensemble system configured to implement a plurality of different machine learning models in parallel processes. The anomaly detection system 28 can be configured to provide a polling mechanism, such as a voting mechanism, for identifying anomalies based on the output of each of the independent models within the ensemble system. In some embodiments, the anomaly detection system 28 implements at least one generalized time-series model for anomaly detection.

In some embodiments, the anomaly detection system 28 is configured to segment detected anomalies into one or more buckets. Each of the buckets is associated with a reviewer system 24a, 24b configured to receiving notifications regarding one or more specific types of anomalies. Anomalies can include, but are not limited to, availability anomalies (e.g., a catalog item being incorrectly indicates as in/out of availability), transaction anomalies, publishing anomalies (e.g., data mismatch between various sources), pricing anomalies, operational anomalies, return anomalies, forecasting anomalies, analytic anomalies, supply chain anomalies, fulfillment anomalies, service anomalies, safety anomalies, etc. Each bucket can be routed to a selected one of the reviewer systems 24a, 24b associated correction of the specific bucket of anomalies.

In some embodiments, the bucketed anomalies are routed via the frontend system 26, although it will be appreciated that the anomaly detection system 28 and/or a separate system can be configured to route bucketed anomalies directly to the associated reviewer systems 24a, 24b. In some embodiments, the reviewer systems 24a, 24b are configured to provide feedback regarding the identification and resolution of detected anomalies. For example, in some embodiments, data regarding the identified anomaly, an indication of whether the identified anomaly was a true anomaly, and resolution of the anomaly can be included in a time-series database in conjunction with the time-series data that originally generated the anomaly indication. The updated time-series data can be utilized for training and/or refinement of additional machine learning models for anomaly detection.

In some embodiments, a model training system 30 is configured to train and/or refine machine learning models for detection of anomalies, in accordance with some embodiments. The model training system 30 can be configured to generate any suitable anomaly detection models. For example, in various embodiments, the model training system 30 can be configured to generate generalized time-series forecasting models (such as a generalized long short-term memory (LSTM) model), clustering-based unsupervised models (such as a k-means model), an ensemble model (such as an isolation forest model), a statistical profiling model (such as a standard deviation model), and/or any other suitable machine learning model.

As discussed in greater detail below, in some embodiments, the model training system 30 is configured to implement an iterative training process configured to train a generalized time-series model. The iterative training process includes labeling of time-series data with one or more characteristic features such that similar time-series can be identified. For example, in some embodiments, the model training system 30 configures a trained generalized time-series model to identify one or more of a plurality of characteristic features in time-series input provided to the model. The characteristics features can be provided as an input to a forecasting portion of a model, such as, for example, a LSTM forecasting model configured to receive the time-series data and the characteristic features.

In various embodiments, the system or components thereof can comprise or include various modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multi-threading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the examples herein.

Figure 3:
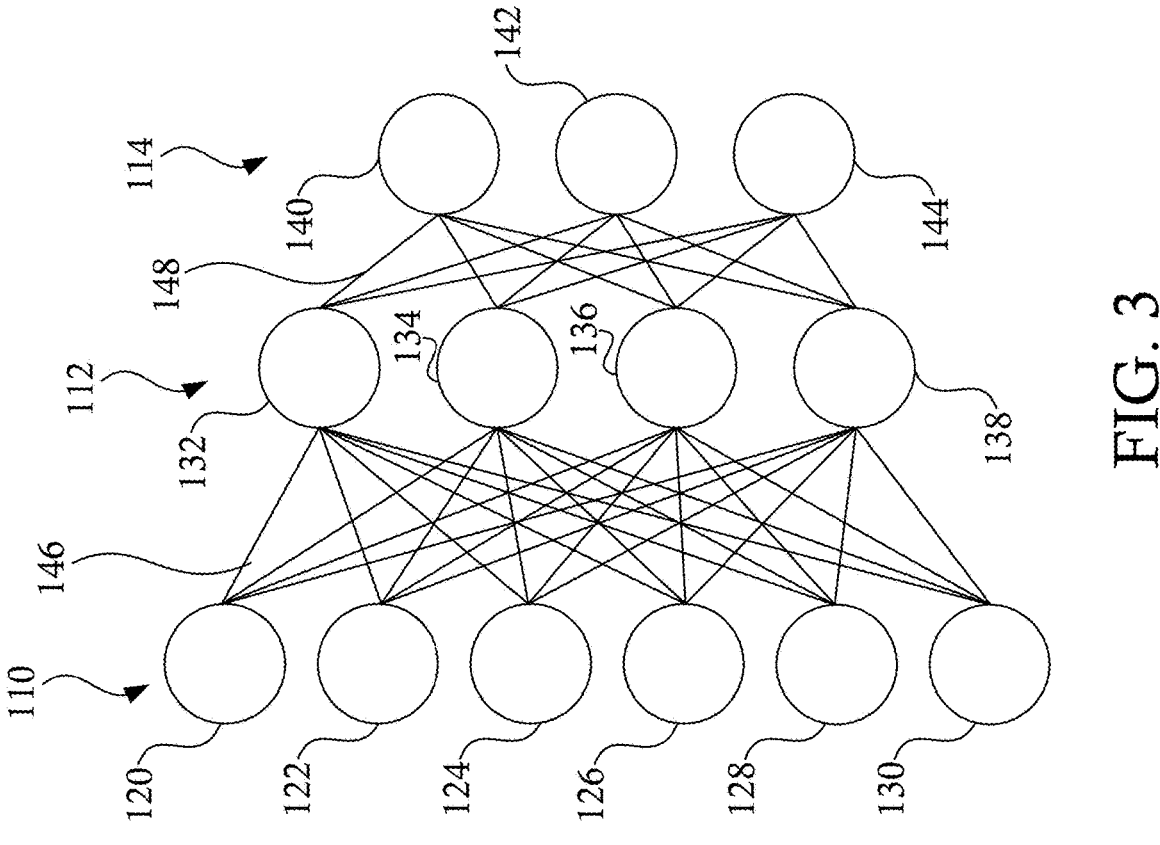
FIG. 3 illustrates an artificial neural network, in accordance with some embodiments.

FIG. 3 illustrates an artificial neural network 100, in accordance with some embodiments. Alternative terms for "artificial neural network" are "neural network," "artificial neural net," "neural net," or "trained function." The neural network 100 comprises nodes 120-144 and edges 146-148, wherein each edge 146-148 is a directed connection from a first node 120-138 to a second node 132-144. In general, the first node 120-138 and the second node 132-144 are different nodes, although it is also possible that the first node 120-138 and the second node 132-144 are identical. For example, in FIG. 3 the edge 146 is a directed connection from the node 120 to the node 132, and the edge 148 is a directed connection from the node 132 to the node 140. An edge 146-148 from a first node 120-138 to a second node 132-144 is also denoted as "ingoing edge" for the second node 132-144 and as "outgoing edge" for the first node 120-138.

The nodes 120-144 of the neural network 100 can be arranged in layers 110-114, wherein the layers can comprise an intrinsic order introduced by the edges 146-148 between the nodes 120-144. In particular, edges 146-148 can exist only between neighboring layers of nodes. In the illustrated embodiment, there is an input layer 110 comprising only nodes 120-130 without an incoming edge, an output layer 114 comprising only nodes 140-144 without outgoing edges, and a hidden layer 112 in-between the input layer 110 and the output layer 114. In general, the number of hidden layer 112 can be chosen arbitrarily and/or through training. The number of nodes 120-130 within the input layer 110 usually relates to the number of input values of the neural network, and the number of nodes 140-144 within the output layer 114 usually relates to the number of output values of the neural network.

In particular, a (real) number can be assigned as a value to every node 120-144 of the neural network 100. Here, $$x_i^{(n)}$$

denotes the value of the i-th node 120-144 of the n-th layer 110-114. The values of the nodes 120-130 of the input layer 110 are equivalent to the input values of the neural network 100, the values of the nodes 140-144 of the output layer 114 are equivalent to the output value of the neural network 100. Furthermore, each edge 146-148 can comprise a weight being a real number, in particular, the weight is a real number within the interval [−1, 1], within the interval [0, 1], and/or within any other suitable interval. Here, $$w_{i,j}^{(m,n)}$$

denotes the weight of the edge between the i-th node 120-138 of the m-th layer 110, 112 and the j-th node 132-144 of the n-th layer 112, 114. Furthermore, the abbreviation $$w_{i,j}^{(n)}$$

is defined for the weight $$w_{i,j}^{(n,n+1)}.$$

In particular, to calculate the output values of the neural network 100, the input values are propagated through the neural network. In particular, the values of the nodes 132-144 of the (n+1)-th layer 112, 114 can be calculated based on the values of the nodes 120-138 of the n-th layer 110, 112 by $$x_j^{(n+1)} = f\left(\sum_i x_i^{(n)} \cdot w_{i,j}^{(n)}\right)$$

Herein, the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the hidden layer(s) 112 can be calculated based on the values of the input layer 110 of the neural network and/or based on the values of a prior hidden layer, etc.

In order to set the values $$w_{i,j}^{(m,n)}$$

for the edges, the neural network 100 has to be trained using training data. In particular, training data comprises training input data and training output data. For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w_{i,j}^{\prime(n)} = w_{i,j}^{(n)} - \gamma \cdot \delta_j^{(n)} \cdot x_i^{(n)}$$

wherein $\gamma$ is a learning rate, and the numbers $$\delta_j^{(n)}$$

can be recursively calculated as $$\delta_j^{(n)} = \left(\sum_k \delta_k^{(n+1)} \cdot w_{j,k}^{(n+1)}\right) \cdot f'\left(\sum_i x_i^{(n)} \cdot w_{i,j}^{(n)}\right)$$

based on $$\delta_j^{(n+1)},$$

if the (n+1)-th layer is not the output layer, and $$\delta_j^{(n)} = \left(x_k^{(n+1)} - t_j^{(n+1)}\right) \cdot f'\left(\sum_i x_i^{(n)} \cdot w_{i,j}^{(n)}\right)$$

if the (n+1)-th layer is the output layer 114, wherein f' is the first derivative of the activation function, and $$y_j^{(n+1)}$$

is the comparison training value for the j-th node of the output layer 114.

Figure 4:
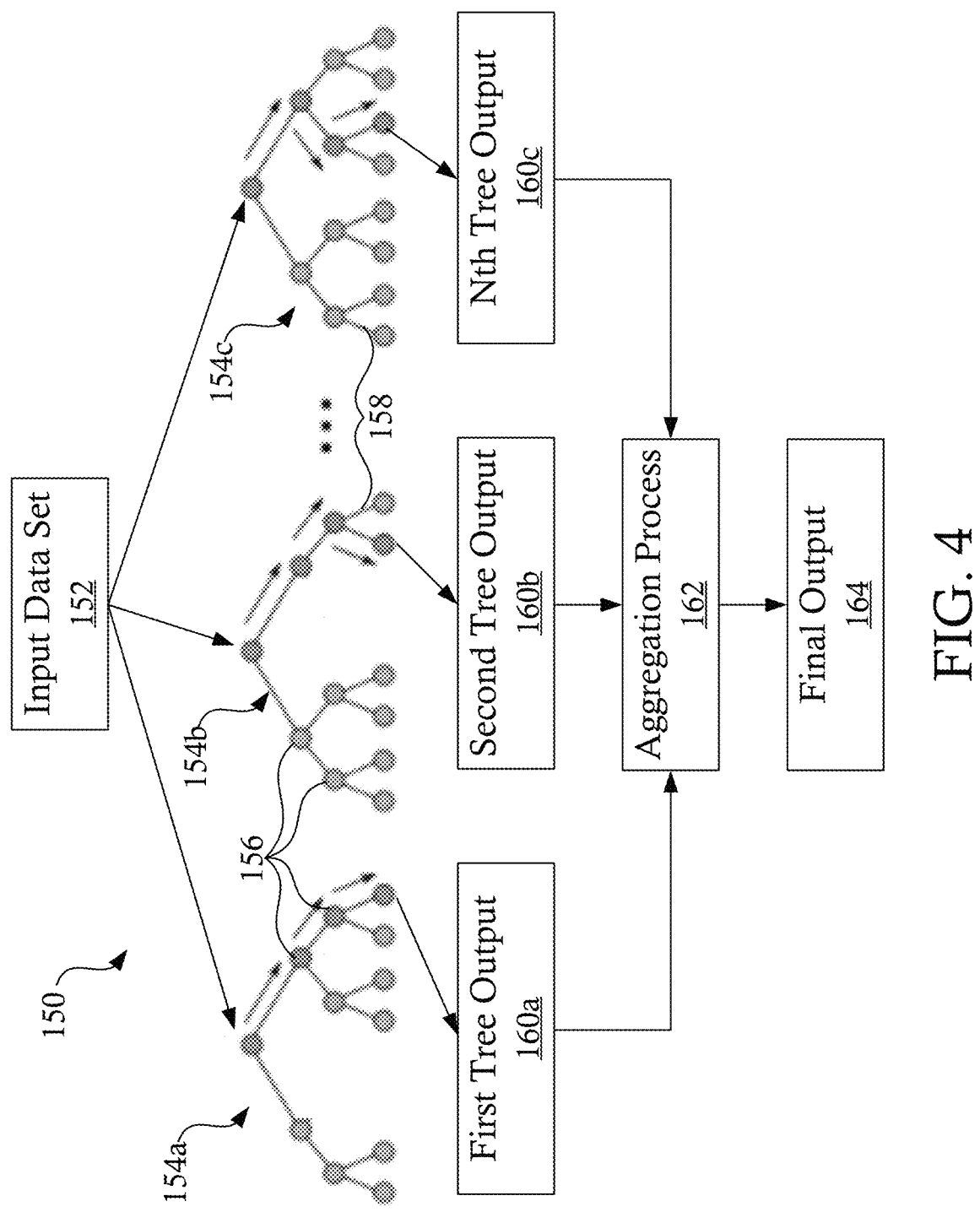
FIG. 4 illustrates a tree-based neural network, in accordance with some embodiments.

FIG. 4 illustrates a tree-based neural network 150, in accordance with some embodiments. In particular, the tree-based neural network 150 is a random forest neural network, though it will be appreciated that the discussion herein is applicable to other decision tree neural networks. The tree-based neural network 150 includes a plurality of trained decision trees 154a-154c each including a set of nodes 156 (also referred to as "leaves") and a set of edges 158 (also referred to as "branches").

Each of the trained decision trees 154a-154c can include a classification and/or a regression tree (CART). Classification trees include a tree model in which a target variable can take a discrete set of values, e.g., can be classified as one of a set of values. In classification trees, each leaf 156 represents class labels and each of the branches 158 represents conjunctions of features that connect the class labels.

Regression trees include a tree model in which the target variable can take continuous values (e.g., a real number value).

In operation, an input data set 152 including one or more features or attributes is received. A subset of the input data set 152 is provided to each of the trained decision trees 154a-154c. The subset can include a portion of and/or all of the features or attributes included in the input data set 152. Each of the trained decision trees 154a-154c is trained to receive the subset of the input data set 152 and generate a tree output value 160a-160c, such as a classification or regression output. The individual tree output value 160a-160c is determined by traversing the trained decision trees 154a-154c to arrive at a final leaf (or node) 156.

In some embodiments, the tree-based neural network 150 applies an aggregation process 162 to combine the output of each of the trained decision trees 154a-154c into a final output 164. For example, in embodiments including classification trees, the tree-based neural network 150 can apply a majority-voting process to identify a classification selected by the majority of the trained decision trees 154a-154c. As another example, in embodiments including regression trees, the tree-based neural network 150 can apply an average, mean, and/or other mathematical process to generate a composite output of the trained decision trees. The final output 164 is provided as an output of the tree-based neural network 150.

Figure 5:
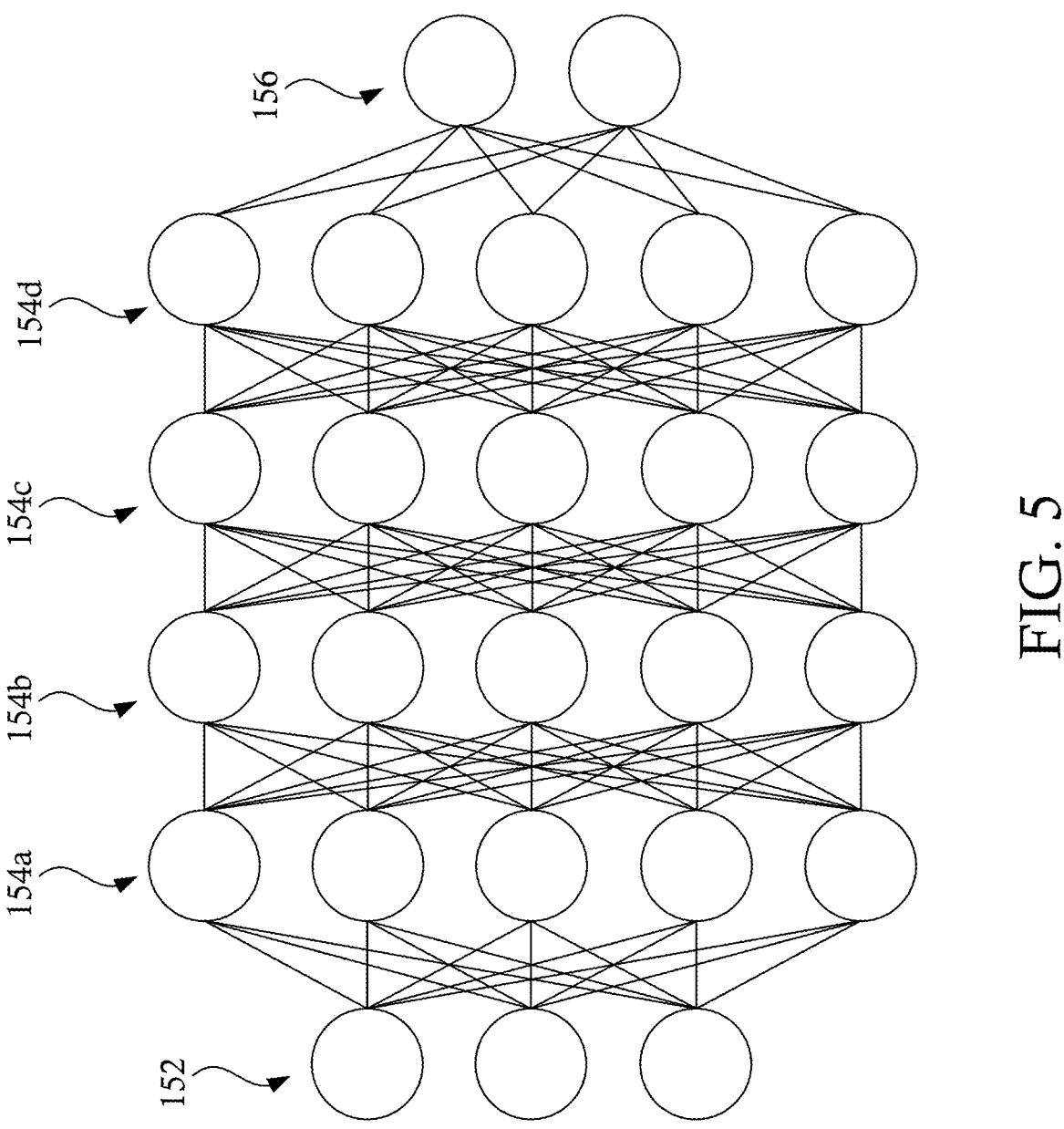
FIG. 5 illustrates a deep learning neural network, in accordance with some embodiments.

FIG. 5 illustrates a deep neural network (DNN) 170, in accordance with some embodiments. The DNN 170 is an artificial neural network, such as the neural network 100 illustrated in conjunction with FIG. 3, that includes representation learning. The DNN 170 can include an unbounded number of (e.g., two or more) intermediate layers 174a-174d each of a bounded size (e.g., having a predetermined number of nodes), providing for practical application and optimized implementation of a universal classifier. Each of the layers 174a-174d can be heterogenous. The DNN 170 can is configured to model complex, non-linear relationships. Intermediate layers, such as intermediate layer 174c, can provide compositions of features from lower layers, such as layers 174a, 174b, providing for modeling of complex data.

In some embodiments, the DNN 170 can be considered a stacked neural network including multiple layers each configured to execute one or more computations. The computation for a network with L hidden layers can be denoted as:

$$f(x) = f\big[a^{(L+1)}\big(h^{(L)}\big(a^{(L)}\big( \dots \big(h^{(2)}\big(a^{(2)}\big(h^{(1)}\big(a^{(1)}(x)\big)\big)\big)\big)\big)\big)\big)\big]$$

where $a^{(l)}(x)$ is a preactivation function and $h^{(l)}(x)$ is a hidden-layer activation function providing the output of each hidden layer. The preactivation function $a^{(l)}(x)$ can include a linear operation with matrix $W^{(l)}$ and bias $b^{(l)}$, where:

$$a^{(l)}(x) = W^{(l)}x + b^{(l)}$$

In some embodiments, the DNN 170 is a feedforward network in which data flows from an input layer 172 to an output layer 176 without looping back through any layers. In some embodiments, the DNN 170 can include a backpropagation network in which the output of at least one hidden layer is provided, e.g., propagated, to a prior hidden layer. The DNN 170 can include any suitable neural network, such as a self-organizing neural network, a recurrent neural network, a convolutional neural network, a modular neural network, and/or any other suitable neural network.

In some embodiments, a DNN 170 can include a neural additive model (NAM). An NAM includes a linear combination of networks, each of which attends to (e.g., provides a calculation regarding) a single input feature. For example, an NAM can be represented as:

$$y = \beta + f_1(x_1) + f_2(x_2) + \dots + f_K(x_K)$$

where $\beta$ is an offset and each $f_i$ is parametrized by a neural network. In some embodiments, the DNN 170 can include a neural multiplicative model (NMM), including a multiplicative form for the NAM mode using a log transformation of the dependent variable y and the independent variable x:

$$y = e^{\beta} e^{f(\log x)} e^{\sum_i f_i^d(d_i)}$$

where d represents one or more features of the independent variable x.

Figure 6:
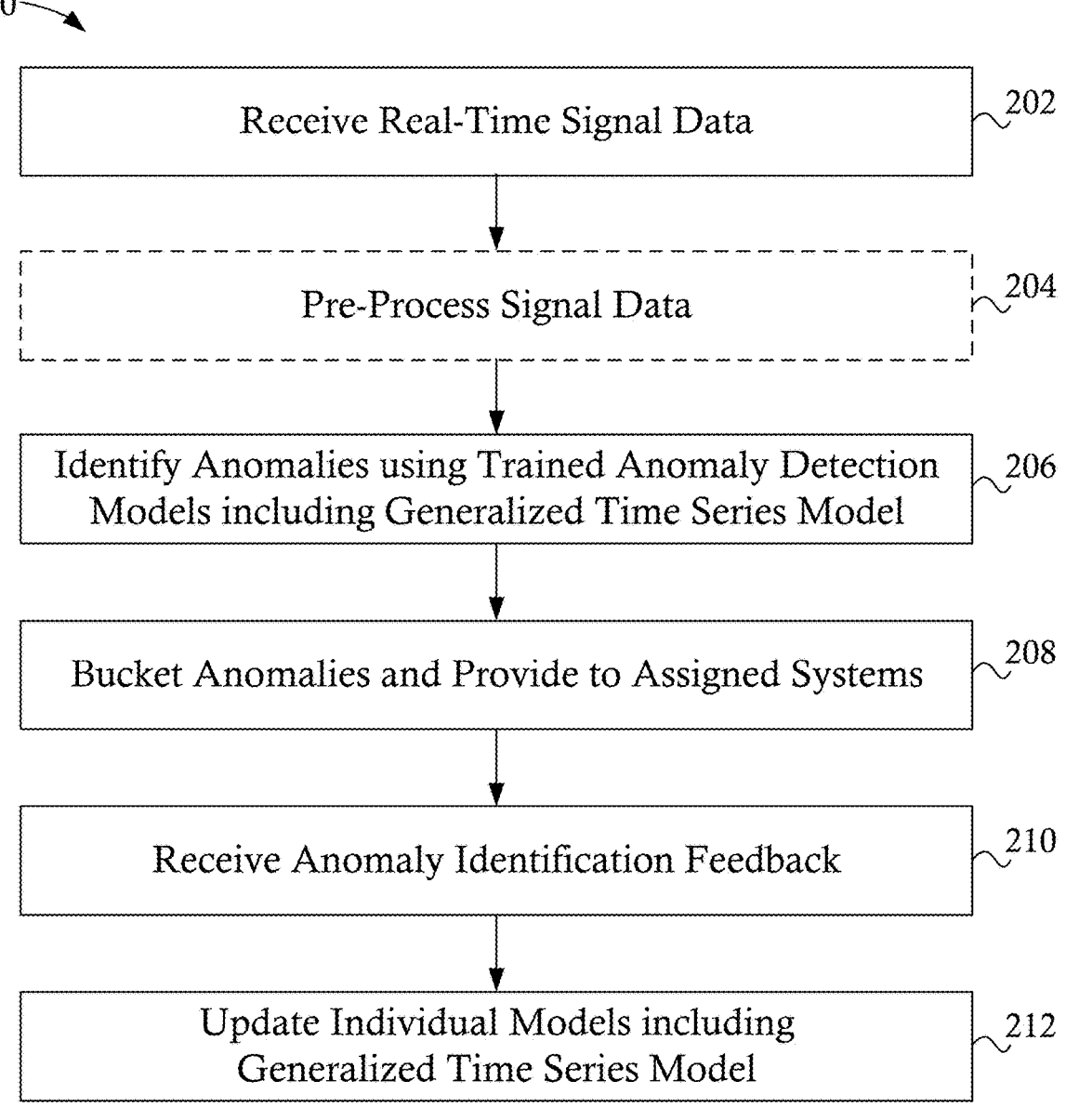
FIG. 6 is a flowchart illustrating a method of anomaly detection utilizing an ensemble approach including at least one generalized time-series model, in accordance with some embodiments.
Figure 7:
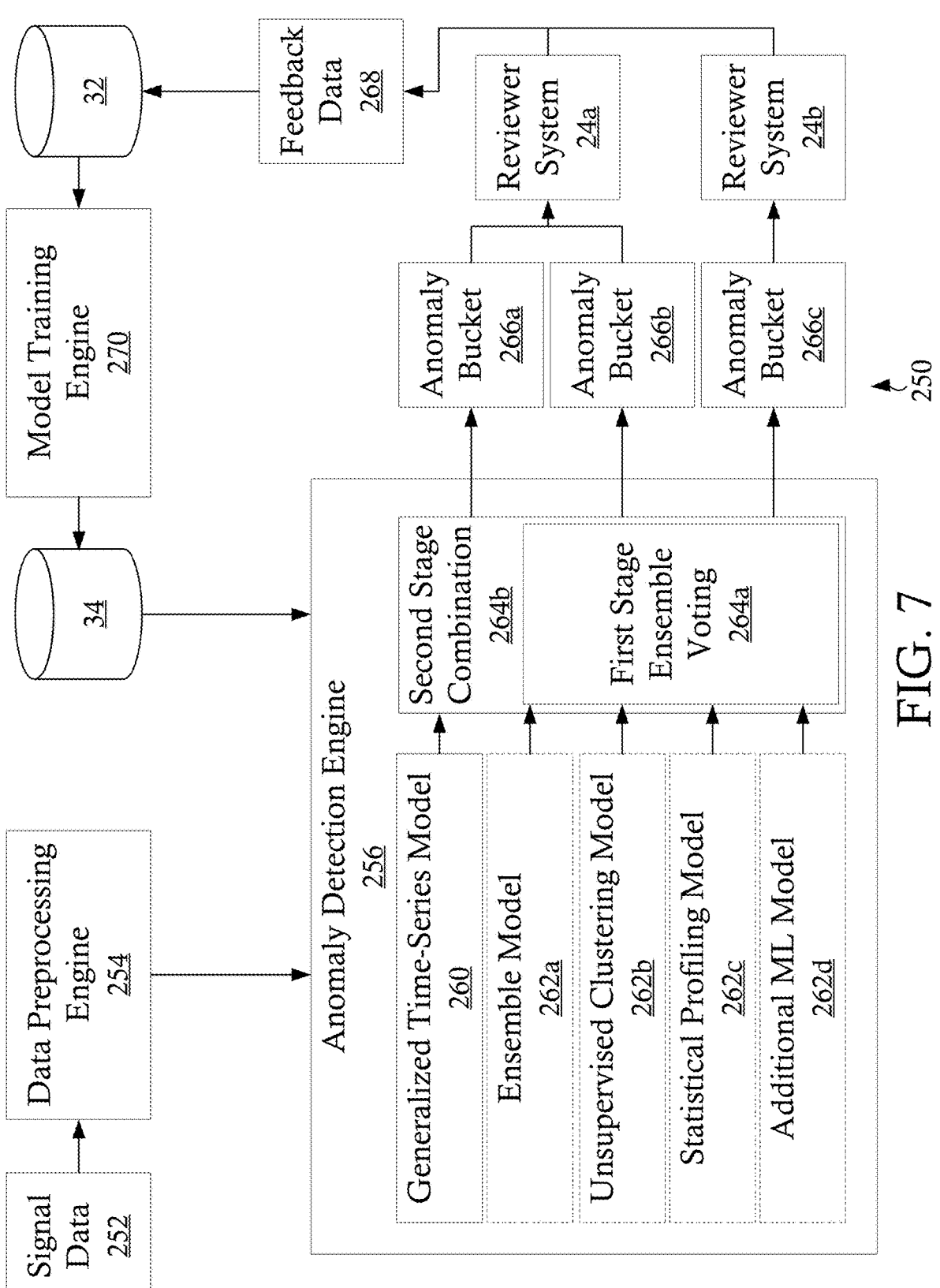
FIG. 7 is a process flow illustrating various steps of the method of anomaly detection utilizing an ensemble approach including at least one generalized time-series model, in accordance with some embodiments.

FIG. 6 is a flowchart illustrating a method 200 of anomaly detection utilizing an ensemble approach including at least one generalized time-series model, in accordance with some embodiments. FIG. 7 is a process flow 250 illustrating various steps of the method of anomaly detection utilizing an ensemble approach including at least one generalized time-series model, in accordance with some embodiments. At step 202, a set of signal data 252 is received. The signal data 252 can include any suitable signals, such as, for example, signals associated with a network platform, external metrics or ingestion pipelines, internal metrics or ingestion pipelines, and/or any other suitable signals. The signal data 252 can be received by a data ingestion pipeline (not shown) configured to receive input signals from multiple sources and generate signal data 252 that is ingestible by an anomaly detection engine 256, as discussed in greater detail below.

In some embodiments, the received signal data 252 can be segmented. For example, signal data 252 can be segmented, or bucketed, into two or more segmentation containers. Segmentation containers can include, but are not limited to, interaction data related to a network interface, internal metrics related to generation and presentation of various elements within a network interface, external metrics related to generation and presentation of various elements within a network interface, and/or any other suitable segments.

In some embodiments, the received signal data 252 is collected in batch format from one or more source systems. Signal data from multiple sources can be combined into one or more time-series to capture time-series interactions with one or more database elements. In some embodiments including an e-commerce interface, signal data can include, but is not limited to, fulfillment, inventory, eligibility, catalog, product, offer, publishing, listing, pricing, impression, and/or other interaction data for one or more items in an item catalog. Data collection can occur at predetermined intervals, such as hourly, daily, etc., and/or can occur in response to one or more triggers.

In some embodiments, at optional step 204, the signal data 252 is preprocessed to format, normalize, and/or otherwise prepare the data for ingestion by one or more machine learning models. A data preprocessing engine 254 can be configured to receive the signal data 252 and generate an processed set of data. For example, in the context of an e-commerce environment, signal data 252 can include sales signals and/or unit sold data for each item in an e-commerce catalog. Signals related to an e-commerce environment can include seasonal variability in which the signals experience regular and predictable changes over predetermined time periods, such as weekly, monthly, etc.

In some embodiments, in order to provide for anomaly detection by one or more anomaly detection models (as discussed in greater detail below), seasonal variability is removed from signal data 252. Seasonal variability can be removed using any suitable process, such as, for example, by decomposing a time-series. For example, in some embodiments, a Seasonal and Trend decomposition using Loess (STL) model is employed to decompose time-series data. A Loess model provides a framework for estimating nonlinear relationships. In some embodiments, a residual component from the STL model is provided to one or more anomaly detection models as a time-series signal input.

In some embodiments, processing of the signal data 252 includes inference of one or more missing values. For example, in some embodiments, characteristic features and/or time-based features can be inferred during a processing step and/or during model implementation, for example, by observing the time-series data over a predetermined time range and extracting features based on the observations. The extracted features can be scaled based on minimum and/or maximum characteristic feature values of a training dataset used to generate a model. Similarly, in some embodiments, a time-series sequence can be scaled based on a minimum and/or maximum value in a training dataset used to generate a model.

At step 206, anomalies in the signal data 252 are identified by applying one or more trained anomaly detection models. For example, in some embodiments, an anomaly detection engine 256 is configured to apply one or more trained anomaly detection models 260, 262a-262d. The one or more anomaly detection models 260, 262a-262d can be individually applied and/or can be applied in one or more ensemble configurations. In some embodiments, the one or more trained anomaly detection models include at least one generalized time-series forecasting model 260. In some embodiments, the one or more trained anomaly detection models include one or more additional anomaly detection models 262a-262d (collectively "additional anomaly detection models 262"). The anomaly detection engine 256 can be configured to obtain each of the generalized time-series forecasting model 260 and/or one or more of the one or more additional anomaly detection models 262a-262d from a model store database 34.

In some embodiments, the anomaly detection engine 256 is configured to implement at least one generalized time-series forecasting model 260. The at least one generalized time-series forecasting model 260 includes a global (or semi-global) model for time-series forecasting. For example, in some embodiments, the at least one generalized time-series forecasting model 260 is a single, global model configured to generate forecast for any set of time-series data that may be received. As another example, in some embodiments, the at least one generalized time-series forecasting model 260 includes a set of k semi-global models that are each generated for one or more subset of the time-series data, such that k<<N, where N is the number of time-series datasets included in a training dataset.

In some embodiments, the at least one generalized time-series forecasting model 260 includes a recurrent neural network (RNN), such as a long short-term memory (LSTM) model, configured to receive time-based features, time-series sequence data, and/or summarized characteristic features as input vectors. An RNN models, such as an LSTM model, configured to utilize time-based features, time-series sequence data, and summarized characteristic features provides a robust prediction mechanism, reducing the number of time-series models required for forecasting. In some embodiments, time-based features, summarized characteristics, and time-series sequence data are utilized to build a single and/or a limited number of global models for prediction.

In some embodiments, a trained generalized time-series forecasting model 260 is configured to utilize summarized time-series characteristics as feature identifiers for each set of time-series sequence data. The summarized time-series characteristic features can be appended to and/or otherwise provided with time-series sequence data. In some embodiments, a generalized time-series forecasting model 260 can be configured to receive time-series data and generate characteristic features from the time-series data. The characteristic features provide an internal identification mechanism to allow a trained model, such as a trained generalized time-series forecasting model 260, to identify similar time-series data sequences. Time-series characteristics can include a predefined set of characteristics and/or can be identified through an iterative model training process, such as the iterative model training process discussed below. The generalized time-series forecasting model 260 is configured to generate forecast predictions for new items based on training and forecasting of time-series sequence data having similar characteristic features.

Various combinations of summarized characteristic features can be utilized by a trained generalized time-series forecasting model 260. For example, in various embodiments, characteristics features can include, but are not limited to, lumpiness (e.g., variance of a chunk-wise variance), entropy (e.g., normalized Shannon entropy of power spectral density), stability (e.g., variance of chunk-wise means), flat spot identification (e.g., maximum run-lengths across equally-sized segments of time-series), Hurst exponent (e.g., index of dependence/autocorrelation), standard deviation (e.g., standard deviation of the first derivative of the time-series), binarized features (e.g., binarized conversions of time-series arrays in which a value above a mean is assigned 1 and a value below mean is assigned 0), test statistics (e.g., Kwiatkowski-Phillips-Schmidt-Shin (KPSS) (such as a vector including statistic for KPSS unit root test with a learn trend and lag one)), heterogeneity (e.g., Engle's test for autoregressive condition heteroscedasticity (ARCH)), measures of mode data (e.g., measures of mode of a data vector using histograms with a given number of bins), linearity features (e.g., r square from a fitted linear regression), standard template library based features for a time-series (e.g., strength of trend, seasonality, spikiness, peak/trough), level shift size (e.g., size of a maximum mean value difference), estimates of smoothing parameter (e.g., smoothing parameters for level-alpha, trend-beta of a linear trend and/or additive season trend-gamma).

In some embodiments, time-series characteristic features are generated by observing a time-series over a predetermined fixed period. For example, in various embodiments, a time-series can be observed for a predetermined time period of days, months, years, etc. to identify characteristic features of the time-series over the predetermined time period. The time-series characteristic features can be summarized using any suitable summarization mechanism and/ or algorithm, such as, for example, a Kats toolkit. In some embodiments, a generalized time-series forecasting model 260 is configured to generate the set of required characteristics features from input time-series data. In other embodiments, time-series characteristic features can be pre-generated by a separate process and/or inferred from comparison of the time-series data to other, similar time-series data.

In some embodiments, the trained generalized time-series forecasting model 260 includes a characteristic feature set-based global time-series model including an LTSM framework. The LTSM framework provides a set of control gates, e.g., a forget gate, an input gate, and an output gate, that operate within each cell of the LTSM framework. An LTSM model eliminates the vanishing gradient problem encountered in some other RNN networks.

In some embodiments, the generalized time-series forecasting model generates a prediction for a time-series using the LTSM model and compares the predicted values to actual time-series data to identify anomalies. For example, in some embodiments, a data point is identified as an anomalous data point if it lies outside of a moving window error-based prediction interval generated by the LTSM model. The window size can be defined during an iterative training process of the LTSM model framework.

In some embodiments, additional time-based features, such as features related to day of the week, month, quarter, year, etc. are generated. The additional time-based features can be determined and/or derived from the input series data and provide event-based temporal signals. The time-based features provide inputs that are impossible or prohibitively difficult to otherwise identify in the time-series data. Time-based features can be generated from time-series data, summarized time-series features, and/or other data elements.

In some embodiments, the anomaly detection engine 256 is configured to implement one or more additional anomaly detection models 262a-262d, such as one or more clustering models 262a (e.g., k-means clustering models), one or more individual ensemble models 262b (e.g., isolation forest models), one or more statistical profiling models 262c (e.g., standard deviation models), and/or any other suitable anomaly detection models 262d.

In some embodiments, at least one additional anomaly detection model includes a clustering model 262a, such as a k-means clustering model. The clustering model is configured to identify potential anomalies based on clustering of data points. For example, in some embodiments, data points that fall within a cluster having a cluster size less than a predetermined threshold can be identified as anomalous. The cluster size threshold can be selected and/or identified during an iterative training process of the clustering model 262a.

In some embodiments, one or more clustering models 262a are generated by an unsupervised learning process. The trained clustering models 262a are configured to distinguish between similar and dissimilar data points such that meaningful group representations can be generated. In k-means clustering, "k" is a hyperparameter defined prior to and/or during an iterative training process. In some embodiments, one or more methods, such as an elbow method, can be implemented to determine a value for k prior to and/or during the iterative training process.

In some embodiments, the one or more additional anomaly detection models include at least one individual ensemble model 262b, such as an isolation forest model. Individual ensemble models are configured to apply an ensemble approach, such as multiple nested trees, to generate a consensus identification of data points as anomalous or non-anomalous signals or interactions. In some embodiments, a data point is identified as anomalous if a predetermined percentage of the individual processing paths within an individual ensemble model identify the data point as anomalous. The predetermined percentage can include any suitable percentage and can be selected during iterative training of the individual ensemble model.

In some embodiments, an individual ensemble model 262b includes an isolation forest model having an ensemble of trees for a given time-series. Anomalies can be defined by nodes that have short average path lengths on an isolated tree. In some embodiments, the isolation forest model can include a random forest implementation including at least two training parameters including a number of trees in the forest and a subsampling size. An isolation forest model can include at least one evaluation parameters, such as a tree height limit, defined prior to and/or during iterative training of the isolation forest model.

In some embodiments, an isolation forest is configured to have a smaller number of trees to provide for faster accuracy convergence. The isolation forest can utilize subsampling to achieve high detection accuracy with high efficiency, even when a smaller number of trees are utilized. In some embodiments, an isolation forest is utilized to omit distance or density measurements from the detection process, eliminating a major computational cost of distance calculations for all distance-based and density-based methods. In order to eliminate bias in an isolation forests that omits distance or density measurements, such models can be combined with one or more additional models in an ensemble configuration, as discussed in greater detail below.

In some embodiments, the one or more additional anomaly detection models include a statistical profiling model 262c, such as a standard deviation-based model. A statistical profiling model is configured to receive time-series data and detect anomalous data points based on normalized data. For example, in some embodiments, a statistical profiling model is configured to remove a mean value, scale time-series data to a unit variance, and apply a threshold determination to identify anomalous data points. A data point can be identified as anomalous if, for example, the normalized data point is less than a first value or greater than a second value. The threshold value(s) can be identified and/or determined during iterative training of the statistical profiling model.

In some embodiments, a statistical profiling model 262c is configured to utilize historic data to model expected behavior of a time-series. A statistical profiling model 262c can be configured for initial screening of anomalies, for example, utilizing one or more tests such as a maximum normed residual test, to detect anomalies in a univariate dataset. In some embodiments, a Z-score is calculated for each test instance x, where the Z-score measures distance in standard deviations between a given observance, e.g., a test instance x, and a mean. The Z-score can additionally represent the distance between a given test instance x and other instances in a time-series. In some embodiments, a Z-score above and/or below predetermined threshold values can indicate an anomalous data point.

In some embodiments, one or more anomaly detection models can be combined in one or more ensemble configurations configured to provide consensus identification of an anomaly. In some embodiments, the output of a first set of models can be provided to a first stage ensemble voting module 264a which identifies a data point as anomalous if a majority of the inputs from the first set of models identify the data point as anomalous. For example, a first set of models can include one or more models, such as a k-means clustering model, an isolation forest model, and a statistical profiling model and anomalous data points can be based on majority identification (e.g. polling) for each of the models.

In some embodiments, the output of a second set of models and/or a first stage ensemble voting module 264*a* can be provided to a second stage ensemble configuration module 264*b* which identifies a data point as anomalous if any of inputs from the second set of models and/or the first stage ensemble voting module 264*a* identifies the data point as anomalous. For example, a second stage ensemble configuration module 264*b* can be configured to receive an output of two or more individual models, such as a generalized time-series forecasting model, a clustering model, an individual ensemble model, a statistical profiling model, etc. As another example, in some embodiments, a second stage ensemble configuration module 264*b* can be configured to receive an output of one or more individual models and one or more first stage ensemble voting modules 264*a*.

In some embodiments, a generalized time-series forecasting model and two or more additional models are arranged in a two-tiered ensemble configuration. The outputs of each of the two or more additional models are provided to a first stage ensemble voting module 264*a* which identifies a data point as anomalous if a majority of the two or more additional models identify the data point as anomalous. The output of the first stage ensemble voting module 264*a* and the output of a generalized time-series forecasting model 260 are each provided to a second stage ensemble configuration module 264*b* which identifies a data point as anomalous if the output of the first stage ensemble voting module 264*a* (e.g., the combination of the two or more additional models) and/or the generalized time-series forecasting model 260 identify the data point as anomalous. Although embodiments are illustrated and discussed herein including a two-tiered ensemble configuration, it will be appreciated that any number tiered ensemble configurations can be combined to detect anomalous data points.

In some embodiments, the anomaly detection engine 256 can be implemented using a computing framework including a cluster computing framework for large scale data analytics, such as, for example, an Apache Spark framework. A cluster computing framework can provide distributed or parallel task dispatching, scheduling, and basing input/output functionalities, providing for parallelization of multiple instances of the disclosed machine learning models. In some embodiments, a cluster computing framework is configured to receive structured and/or semi-structured data from different sources and/or causes, Hive tables, parquet, and/or SQL support via command line interfaces.

At step 208, identified anomalies are bucketed into one or more buckets 266*a*-266*c* (collectively "buckets 266"). Each of the buckets 266 is associated with at least one reviewer system 24*a*, 24*b* configured to address, review, and/or otherwise interact with specific types of anomalies. For example, in some embodiments, a first anomaly bucket 266*a* and a second anomaly bucket 266*b* can be associated with a first reviewer system 24*a* and a third anomaly bucket 266*c* can be associated with a second reviewer system 24*b*. Although embodiments are illustrated herein having one or more buckets assigned to a reviewer system 24*a*, 24*b*, it will be appreciated that a single anomaly bucket 266 can be similarly assigned to multiple reviewer systems 24*a*, 24*b*. In some embodiments, bucketing is performed based on one or more rules applied to each of the identified anomalous data points.

At step 210, feedback data 268 is received from each of the reviewer systems 24*a*, 24*b* regarding identification and/or resolution of the identified anomaly. In some embodiments, feedback data 268 can include an indication that the identified anomaly was an actual anomaly or normal behavior incorrectly identified as anomalous. In some embodiments, feedback data 268 can include additional anomalies or anomalous data points that were not identified as anomalous by the anomaly detection engine 256. The feedback data 268 can be stored in any suitable storage mechanism, such as, for example, associated with time-series data in the time-series database 32.

At step 212, at least one of the trained anomaly detection models 260, 262 are updated based, at least in part, on the feedback data 268. In some embodiments, new and/or updated models can be generated by a model training engine 270 according to an iterative training process that incorporates the feedback data 268 as part of a training dataset, such as the iterative training method 300 discussed with respect to FIGS. 8-9. The new and/or updated models can be stored in any suitable storage mechanism, such as, for example, a model store database 34. The new and/or updated models can be implemented by the anomaly detection engine 256 for analysis of additional real time signal datasets.

The disclosed method 200 provides for identification and resolution of anomalies in one or more network environments by creating a comprehensive approach utilizing a set of time-series signals to identify issues impacting operation of a network environment. The method 200 leverages machine learning and deep learning techniques on historical time-series data to raise alerts regarding observed anomalies in real-time or semi-real-time time-series data. The disclosed method 200 utilizes one or more anomaly detection models 260, 262 that can be utilized over longer time periods without retraining (e.g., do not require daily retraining and deployment), saving compute resources and time compared to current methods.

The task of identifying an anomalous data points (e.g., identifying the interaction as anomalous as the interaction occurs or within a predetermined time period after the interaction) can be burdensome and time consuming, extending periods of interaction beyond those necessary for the initial interaction to be completed. Where interactions include an element of exchange, e.g., retail transactions, return transactions, monetary transfers, etc., the timeframe for those interactions is measured in minutes with several steps needing to be performed in order to complete the interaction. Typically, identification of anomalous interactions cannot be performed within the limited time frame available to interactions of interest and is limited by available resources, which are often devoted to processing the interaction itself and cannot be used for anomaly detection.

Systems and methods of anomaly classification that reduce processing burdens, such as those disclosed herein, significantly reduce this problem. For example, in embodiments disclosed herein, when a data point is classified as anomalous, an interface page can be modified or converted to prevent completion of an interaction and to inform individuals responsible for the data point about the anomalous interaction. Each classification thus serves as a programmatically selected interface aid that activates or disables certain interface functions based on the classification. Beneficially, programmatically enabling or disabling interface functions can improve the speed and accuracy of a user's navigation through an interface in order to complete a transaction. For example, a responsible party can immediately address an anomalous data point through an interface upon identification of an anomalous interaction and resolve an identified anomaly in a time frame that allows for completion or denial of an interaction. This can be particularly beneficial for computing devices that receive or address multiple anomalous data points, as the identification and notification of anomalies allows for conservation of resources unless and until anomalies are identified in time-series data.

Figure 8:
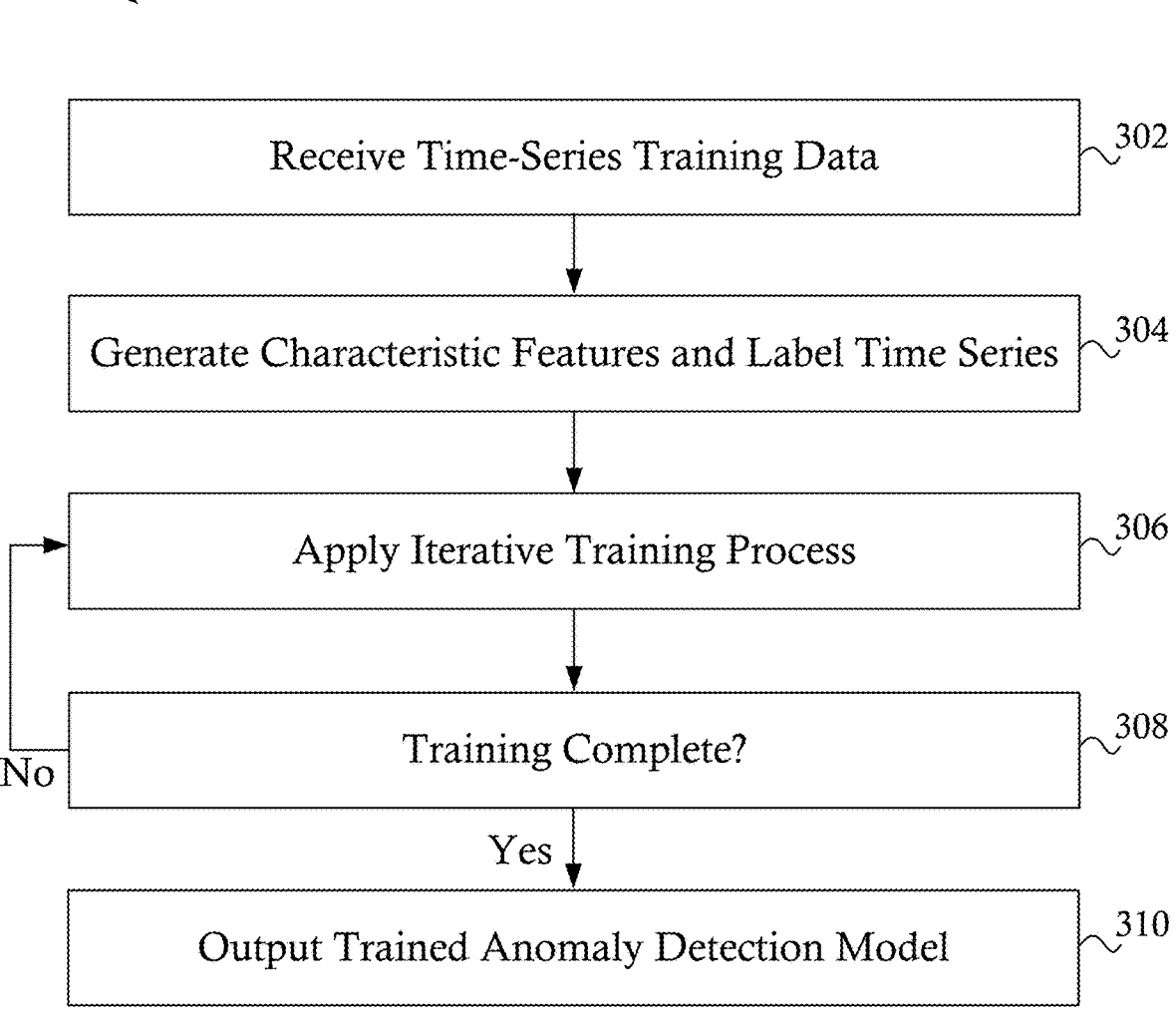
FIG. 8 is a flowchart illustrating a method of training a generalized time-series model, in accordance with some embodiments.
Figure 9:
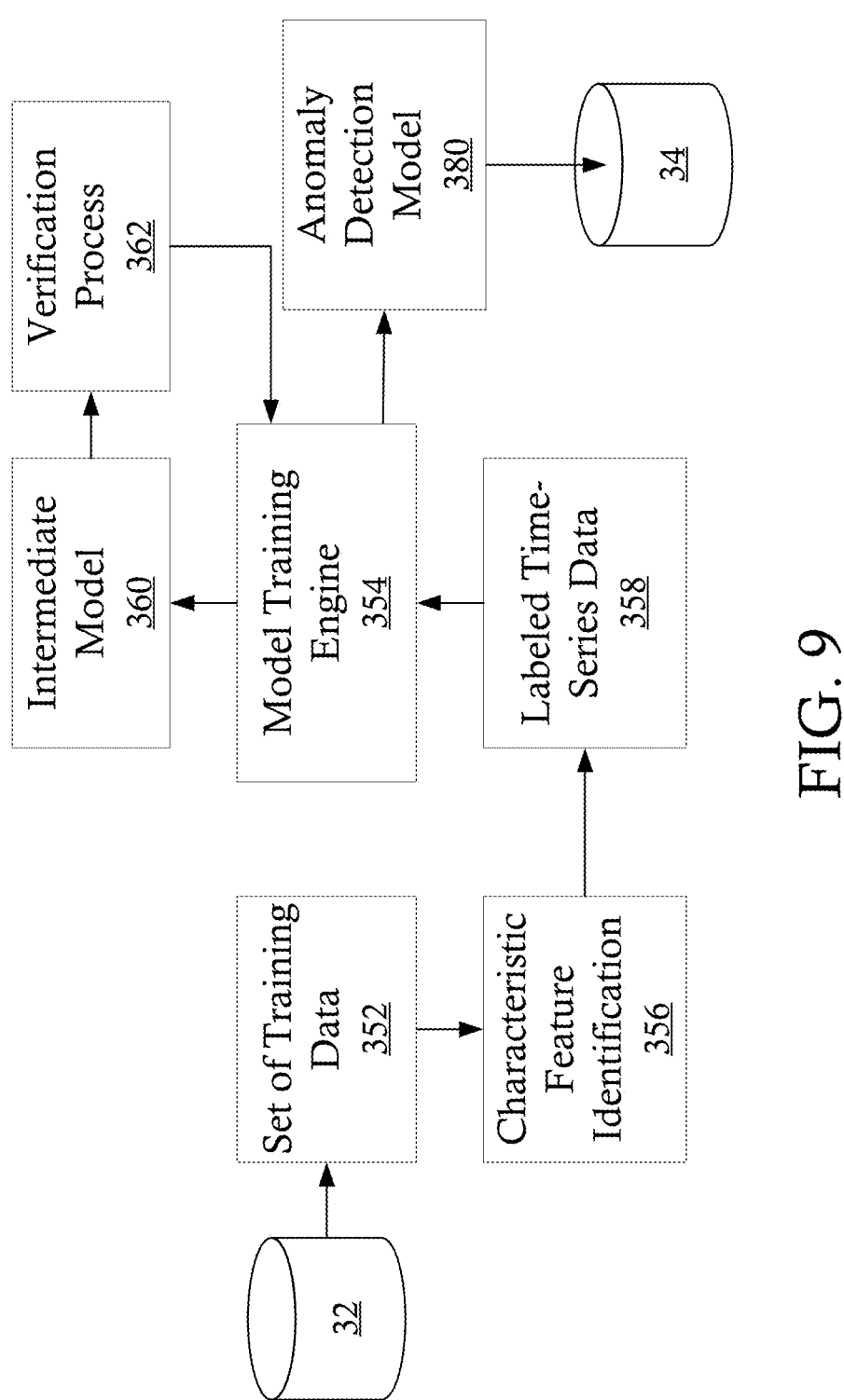
FIG. 9 is a process flow illustrating various steps of the method of training a generalized time-series model, in accordance with some embodiments.

FIG. 8 is a flowchart illustrating a method 300 of training a generalized time-series model, in accordance with some embodiments. FIG. 9 is a process flow 350 illustrating various steps of the method of training a generalized time-series model, in accordance with some embodiments. At step 302, a training dataset 352 is received by a system, such as a model training system 30, configured to implement one or more model training processes, such as a model training engine 270. The training dataset 352 includes a plurality of time-series datasets. Each of the time-series datasets can include production data selected via a moving window. In some embodiments, each time-series dataset can include one or more features, such as time-based features, characteristic features, and/or any other suitable features.

In some embodiments, the training dataset 352 includes feature identifiers configured to identify a set of features to be utilized by a trained model from the time-series datasets. The feature identifiers can include characteristic feature identifiers, time-based feature identifiers, and/or any other suitable feature identifiers. In some embodiments, each of the time-series dataset are single time-series for a predetermined period of time. For example, in some embodiments, each of the time-series datasets include time-series data for a predetermined period including days, weeks, months, years, etc. Each time-series dataset can include similar time periods and/or can include variable time periods. The variable time periods can be selected to exceed a predetermined minimum period.

In some embodiments, the training dataset 352 is processed and/or normalized by a normalization module 360. For example, in some embodiments, the training dataset 352 can be augmented by imputing or estimating missing values of one or more features associated with a sequential state change. In some embodiments, processing of the received training dataset 352 includes outlier detection configured to remove data likely to skew training of an anomaly prediction model. In some embodiments, processing of the received training dataset 352 includes removing features or time-series datasets that have limited value with respect to training of the anomaly prediction model.

In some embodiments, processing of the training dataset 352 includes inference of one or more missing values. For example, in some embodiments, time-series data is provided in the training dataset 352 without characteristic feature and/or time-based features. Such features can be inferred during a processing step and/or during model training, for example, by observing the time-series data over a predetermined time range and extracting features based on the observations. The extracted features can be scaled based on minimum and/or maximum characteristic feature values. Similarly, in some embodiments, a time-series sequence can be scaled based on a minimum and/or maximum value in the training dataset 352.

At step 304, at least one characteristic feature is generated for each time-series in the training dataset 352. The at least one characteristic is generated by observing a time-series for a predetermined time period of days, months, years, etc. to identify characteristic features of the time-series over the predetermined time period. The time-series characteristic features can be summarized using any suitable summarization mechanism and/or algorithm, such as, for example, a Kats toolkit.

At step 306, an iterative training process is executed to train a selected model framework 362 to generate a trained anomaly detection model. The iterative training process can include a supervised training process (e.g., a training process utilizing pre-labeled training data for directing training of one or more aspects of a model) and/or an unsupervised training process (e.g., a training process utilizing unlabeled data that provides for organic identification of significant features, groupings, etc.). For example, a model training engine 370 can be configured to obtain a selected model framework 362 including an untrained (e.g., base) machine learning model, such as a LSTM framework, a k-means framework, a isolation forest framework, a statistical framework, any other suitable machine learning framework, and/or a partially or previously trained model (e.g., a prior version of a trained anomaly detection model, a partially trained model from a prior iteration of a training process, etc.), from a model store, such as a model store database 34. The model training engine 370 is configured to iteratively adjust parameters (e.g., hyperparameters) of the selected model framework 362 to minimize a cost value (e.g., an output of a cost function) for the selected model framework 362.

In some embodiments, the model training engine 370 implements an iterative training process that generates a set of revised model parameters 366 during each iteration. The set of revised model parameters 366 can be generated by applying an optimization process 364 to the cost function of the selected model framework 362. The optimization process 364 can be configured to reduce the cost value (e.g., reduce the output of the cost function) at each step by adjusting one or more parameters during each iteration of the training process. In some embodiments, the cost function is defined based on a difference between a forecasted value for a time-series and an actual value of a time-series.

After each iteration of the training process, at step 308, the model training engine 370 determines whether the training process is complete. The determination at step 308 can be based on any suitable parameters. For example, in some embodiments, a training process can complete after a predetermined number of iterations. As another example, in some embodiments, a training process can complete when it is determined that the cost function of the selected model 362 has reached a minimum, such as a local minimum and/or a global minimum.

At step 310, a trained anomaly detection model 380 is output and provided for use in an interface generation method, such as the method 200 discussed above with respect to FIGS. 5-6. The trained anomaly detection model 380 can include a generalized time-series forecasting model and/or an additional anomaly detection model. At optional step 312, a trained anomaly detection model 380 can be evaluated by an evaluation process 368 to determine the success rate of anomaly detection generated by the trained anomaly detection model 380.

Although the subject matter has been described in terms of exemplary embodiments, it is not limited thereto. Rather, the appended claims should be construed broadly, to include other variants and embodiments, which can be made by those skilled in the art.

What is claimed is:
1. A system, comprising:
a non-transitory memory; and a processor communicatively coupled to the non-transitory memory, wherein the processor is configured to read a set of instructions to:

receive a time-series dataset;

preprocess the time-series dataset by decomposing the time-series dataset using Seasonal and Trend decomposition using locally estimated scatterplot smoothing (STL) to remove seasonal variability and provide a residual component;

generate a forecast for the time-series dataset utilizing a trained generalized time-series forecasting model comprising a recurrent neural network implemented as a long short-term memory (LSTM) model configured to utilize a fixed set of characteristic features;

generate a first anomaly determination for the time-series dataset based on a comparison of the forecast to the residual component for the time-series dataset, wherein the first anomaly determination identifies a data point as anomalous when an observed value lies outside of a moving-window error-based prediction interval determined during iterative training of the LSTM model;

generate a second anomaly determination for the time-series dataset utilizing an ensemble of additional anomaly detection models which apply a first-stage majority voting process across outputs of the ensemble of additional anomaly detection models to identify an anomalous data point;

determining a final anomaly classification in a second-stage ensemble configuration by identifying a data point as anomalous if either the first anomaly determination or the majority output from the first-stage ensemble identifies the data point as anomalous; and in response to the final anomaly determination identifying an anomaly, transmitting an anomaly identification notification to an additional system associated with the anomaly identification notification.

2. The system of claim 1, wherein the trained generalized time-series forecasting model is configured to utilize one or more time-based features generated from the time-series dataset.

3. The system of claim 1, wherein the trained generalized time-series forecasting model comprises a plurality of generalized time-series forecasting each configured to generate a forecast for time-series having a predetermined set of characteristic features.

4. The system of claim 1, wherein the processor is configured to, prior to transmitting the anomaly identification notification, sort the anomaly into a first bucket associated with the additional system, wherein the bucket is associated with a type of the anomaly.

5. The system of claim 4, wherein the anomaly identification notification is sent to a reviewer system associated with the bucket.

6. The system of claim 5, wherein the reviewer system is associated with at least one bucket of anomalies and is configured to receive the anomaly identification notification for anomalies assigned to the at least one bucket.

7. The system of claim 5, wherein the reviewer system is configured to provide feedback including an indication whether the identified anomaly was an actual anomaly or normal behavior and resolution information, and wherein the feedback is stored in a time-series database in association with time-series data that generated the anomaly identification.

8. The system of claim 1, wherein feedback provided by the reviewer system is incorporated into an iterative training process executed by a model training engine to update one or more trained anomaly detection models, and updated models are stored in a model store database.

9. The system of claim 1, wherein the reviewer system is configured to identify additional anomalous data points not identified by an anomaly detection engine and to provide the additional anomalous data points as part of the feedback stored for use in training and refinement of anomaly detection models.

10. The system of claim 1, wherein the anomaly identification notification is routed to the reviewer system via a frontend system or directly from an anomaly detection system.

11. The system of claim 1, wherein the processor is configured to determine a size of a moving window used for the error-based prediction interval during iterative training and to use the window size when identifying an anomalous data point.

12. The system of claim 1, wherein the processor is further configured to evaluate a trained anomaly detection model by executing an evaluation process to determine a success rate of anomaly detection prior to deployment.

13. A computer-implemented method, comprising:

receiving a time-series dataset;

preprocessing the time-series dataset by decomposing the time-series dataset using Seasonal and Trend decomposition using locally estimated scatterplot smoothing (STL) to remove seasonal variability and provide a residual component;

generating, by a trained generalized time-series forecasting model comprising a recurrent neural network implemented as a long short-term memory (LSTM) model, a forecast for the time-series dataset using a fixed set of characteristic features;

generating a first anomaly determination for the time-series dataset based on a comparison of the forecast to the residual component for the time-series dataset, wherein the first anomaly determination identifies a data point as anomalous when an observed value lies outside of a moving-window error-based prediction interval determined during iterative training of the LSTM model;

generating a second anomaly determination for the time-series dataset utilizing an ensemble of additional anomaly detection models which apply a first-stage majority voting process across outputs of the ensemble of additional anomaly detection models to identify an anomalous data point;

determining a final anomaly classification in a second-stage ensemble configuration by identifying a data point as anomalous if either the first anomaly determination or the majority output from the first-stage ensemble identifies the data point as anomalous in response to the final anomaly determination identifying an anomaly, transmitting an anomaly identification notification to a system associated with the anomaly identification notification.

14. The computer-implemented method of claim 13, wherein the generalized time-series forecasting model is configured to utilize one or more time-based features generated from the time-series dataset.

15. The computer-implemented method of claim 13, wherein the trained generalized time-series forecasting model comprises a plurality of generalized time-series forecasting models each configured to generate a forecast for time-series having a predetermined set of characteristic features.

16. The computer-implemented method of claim 13, comprising sorting the identified anomaly into a first bucket associated with the system, wherein the bucket is associated with a type of the anomaly.

17. A computer-implemented method, comprising:

receiving a plurality of historic time-series datasets;

preprocessing each of the historic time-series dataset by decomposing the time-series dataset using Seasonal and Trend decomposition using locally estimated scatterplot smoothing (STL) to remove seasonal variability and provide a corresponding residual component;

generating a fixed set of characteristic features for each of the time-series datasets;

generating at least one time-based feature for each of the time-series datasets;

iteratively training a generalized time-series forecasting model to generate a time-series forecast based, at least in part, on the at least one characteristic feature and the at least one time-based feature generated for each of the time-series datasets, the generalized time-series forecasting model comprising a recurrent neural network implemented as a long short-term memory (LSTM) model; and storing the generalized time-series forecasting model in a model store database.

18. The computer-implemented method of claim 17, wherein the fixed set of characteristic features is generated by observing a selected time-series in the plurality of historic time-series datasets over a predetermined time period.

19. The computer-implemented method of claim 17, wherein iteratively training the generalized time-series forecasting model comprises reducing a cost function based on a forecast for a selected one of the plurality of historic time-series datasets and the selected one of the plurality of historic time-series datasets.

* * * * *